United States Patent
Ash

(10) Patent No.: US 10,493,501 B2
(45) Date of Patent: Dec. 3, 2019

(54) METHOD AND APPARATUS FOR WASHING VEHICLE BATTERIES

(71) Applicant: Noel B. Ash, Otisville, MI (US)

(72) Inventor: Noel B. Ash, Otisville, MI (US)

(*) Notice: Subject to any disclaimer, the term of this patent is extended or adjusted under 35 U.S.C. 154(b) by 28 days.

(21) Appl. No.: 15/981,346

(22) Filed: May 16, 2018

(65) Prior Publication Data

US 2018/0369877 A1 Dec. 27, 2018

Related U.S. Application Data

(60) Provisional application No. 62/524,976, filed on Jun. 26, 2017.

(51) Int. Cl.

| | |
|---|---|
| *H01M 2/36* | (2006.01) |
| *B08B 3/14* | (2006.01) |
| *B08B 3/10* | (2006.01) |
| *B08B 3/02* | (2006.01) |
| *B08B 17/02* | (2006.01) |

(52) U.S. Cl.
CPC ............. *B08B 3/14* (2013.01); *B08B 3/02* (2013.01); *B08B 3/10* (2013.01); *B08B 17/025* (2013.01); *H01M 2/364* (2013.01); *B08B 2203/007* (2013.01)

(58) Field of Classification Search
CPC .... B08B 3/14; B08B 3/02; B08B 3/10; B08B 17/025; B08B 2203/007; H01M 2/364
See application file for complete search history.

(56) References Cited

U.S. PATENT DOCUMENTS

| | | | | |
|---|---|---|---|---|
| 5,095,926 | A | * | 3/1992 | Wegner ............... H01M 10/42 134/111 |
| 5,248,342 | A | * | 9/1993 | Montgomery ........... C08J 11/06 134/10 |
| 5,265,630 | A | * | 11/1993 | Hartmann ................ B08B 3/02 134/103.1 |
| 5,305,769 | A | | 4/1994 | Jung |
| 5,590,671 | A | * | 1/1997 | Yachera ................... B08B 3/02 134/103.1 |
| 6,016,818 | A | | 1/2000 | Evaro et al. |

(Continued)

OTHER PUBLICATIONS

BHS Battery Handling Systems, Battery Wash Equipment, product brochure, 2016, 9 pages, Battery Handling Systems, Inc., St. Louis, U.S.

(Continued)

*Primary Examiner* — Sharidan Carrillo
(74) *Attorney, Agent, or Firm* — Northern Michigan Patent Law, PLC

(57) ABSTRACT

A battery washing machine for automotive type vehicle batteries, comprising an enclosed wash cabinet with an overhead spray apparatus, drain racks for supporting the batteries below the spray apparatus, and a water tank beneath the drain racks. The water tank is divided into separator and recirculating supply portions by a vertical separator wall that is partly screened and partly solid. The upper end of the separator portion of the tank is covered with a screen, while the upper end of the recirculating supply portion is covered with a solid water-diverting panel. Solid contaminants are screened and/or settled out of the re-circulated wash water in the tank by the vertical separator wall.

3 Claims, 5 Drawing Sheets

(56) References Cited

U.S. PATENT DOCUMENTS 6,044,852 A 4/2000 Epperson, Jr. et al.
2018/0369877 A1* 12/2018 Ash ........................ B08B 3/14

OTHER PUBLICATIONS

Nieros, Automotive Battery Washer CLT ACU, website advertisement, 2018 (2013-2016 unarchived web publications suspected), Nieros International, U.S.
Nieros, Nieros Special Industrial Washing Machine—Automotive Battery Washing , Youtube video screenshot, 2013, Nieros Metal (via Youtube), U.S.

* cited by examiner

METHOD AND APPARATUS FOR WASHING VEHICLE BATTERIES

RELATED APPLICATIONS/PRIORITY BENEFIT CLAIM

This application claims the benefit of U.S. Provisional Application No. 62/524,976, filed Jun. 26, 2017 by the same inventor (Ash), the entirety of which provisional application is hereby incorporated by reference.

FIELD

The subject matter of the present application is in the field of machines for washing vehicle batteries.

BACKGROUND

It is known to use large industrial washing machines for washing parts; these are commonly known as "parts washers". Examples include those shown in U.S. Pat. No. 5,305,769 to Jung (power spray washing machine with enclosed wash cabinet positioned above a wash holding tank and a rinse holding tank); U.S. Pat. No. 6,016,818 to Evaro et al. (recirculating parts washer with a vertically mounted base and a sink and lid rotatably connected to the base); and U.S. Pat. No. 6,044,852 to Epperson, Jr. et al. (parts washer with a housing having a wash chamber charged with fluid, a spray tube rotatably positioned in the housing, and a support structure in the housing to support parts being washed within a volume of rotation of the spray tube).

A problem not adequately addressed by prior parts washers is the need in some businesses or industrial sectors to clean significant numbers of vehicle batteries, for example when maintaining the batteries in a fleet of vehicles, or when reconditioning, recycling, or reselling used batteries.

Vehicle batteries are typically large, heavy, and dirty, and are most commonly of the 12 v lead-acid type. They can be difficult and unpleasant to clean due to acid leakage, and environmental regulations can make disposal of the lead-contaminated wash and rinse water difficult and costly.

BRIEF SUMMARY

The present invention is a washing machine for washing heavy vehicle batteries (e.g., marine and automotive) and similar industrial type batteries, in particular 12v lead-acid batteries, but useful for other chemistries and voltages as well.

The washing machine comprises an enclosed wash cabinet with an interior wash compartment having an overhead spray assembly; one or more horizontal drain racks for supporting batteries beneath the spray assembly in the cabinet, while letting water through; a recirculating water tank below the wash compartment, with an open upper end in fluid communication with the wash compartment; one or more solid diverter panels in the wash compartment beneath the racks for diverting water to the open upper end of the water tank; a cover screen over the open upper end of the water tank to screen out debris; and a re-circulating pump assembly connected to the water tank to return water to the spray assembly.

The water tank is divided into a separator compartment and a re-circulating supply compartment by a vertical separator wall extending the full height of the tank, the separator wall comprising a solid lower baffle section and an upper screen section. The separator compartment is open at the upper end to receive wash water through the rack above, either directly or from a diverter panel, while the re-circulating supply compartment is closed at the upper end by a cover panel extending to the separator wall. The cover panel may be part of or an extension of one of the diverter panels.

In a further form, the cover panel in the wash compartment above the recirculating supply compartment of the water tank is removable for direct overhead access to the recirculating supply compartment. In a further form, the cover screen over the open upper end of the separator compartment extends over the adjacent wash compartment bottom diverter panel covering the supply compartment of the water tank, providing a pre-filtering action. In a further form, the screen portion of the vertical separator wall is of a finer mesh than the top cover screen.

After passing over the batteries and through the drain rack, used wash water flows horizontally across the bottom panel portion of the wash compartment to the screen covering the open upper end of the separator compartment, through which the water falls into the separator compartment. The solid lower baffle portion of the vertical separator wall causes sediment not filtered by the top cover screen to settle out, and the wash water then flows through the upper screen section of the separator wall into the re-circulating tank from where it is pumped back to the spray assembly.

Periodically the sediment in the separator compartment can be cleaned out, for example by personnel trained and licensed to dispose of lead and other hazardous or toxic metals and chemicals.

In a further form, the battery washing machine includes a sealed front-opening lift door with a drip tray built into the frame that drains into the wash cabinet.

These and other features and advantages of the invention will become apparent from the detailed description below, in light of the accompanying drawings.

DETAILED DESCRIPTION

Figure 1:
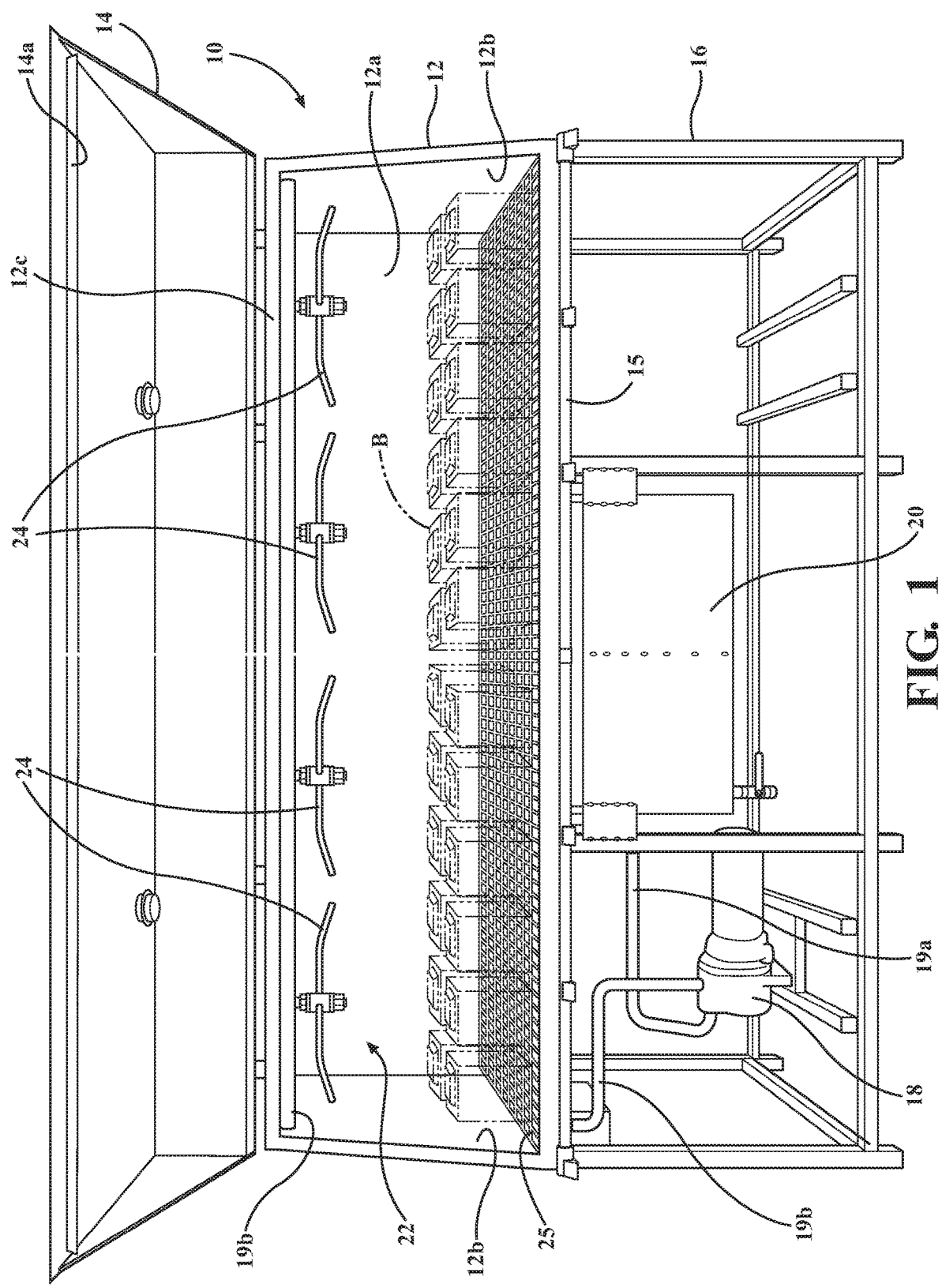
FIG. 1 is a front elevation view of an example battery washing machine according to the invention.

Referring first to FIG. 1, a battery washing machine 10 is shown in exemplary form in order to teach how to make and use the claimed invention. Washing machine 10 includes a main cabinet 12 with rear wall 12a, sidewalls 12b, and top wall 12c enclosing an interior wash compartment 22, and a hinged or lift-type front door panel 14 capable of closing off the interior wash compartment 22 in watertight fashion. Cabinet 12 is preferably made from stainless steel, although other waterproof, durable, corrosion-resistant materials could be used, and is supported on a frame or stand 16 made from similar material.

Battery washing machine 10 is powered by a pump or pump motor unit 18 of known, commercially available type, suitable for pumping and recirculating wash water or suitable alternate cleaning fluid or solution (hereafter "wash water") from a water separator/supply tank 20 below wash compartment 22 to overhead spray apparatus such as wash rotors 24 of known, commercially available type mounted at the upper part of the wash compartment. The wash water is pumped in a closed loop from tank 20 to rotors 24 through suitable piping 19a and 19b connected to pump motor 18. It will be understood that although overhead spray apparatus 24 is illustrated as rotor type, other known types of overhead sprayer mechanism could be used (for example, fixed spray tubes or nozzles, oscillating wands, etc.).

The lower part of wash compartment 22 is provided with one or more battery-supporting drain racks 25 suitably strong to support the weight of multiple automotive type batteries B in the wash environment. Battery drain racks 25 may be made from any known heat- and corrosion-resistant plastic or metal.

Figure 2:
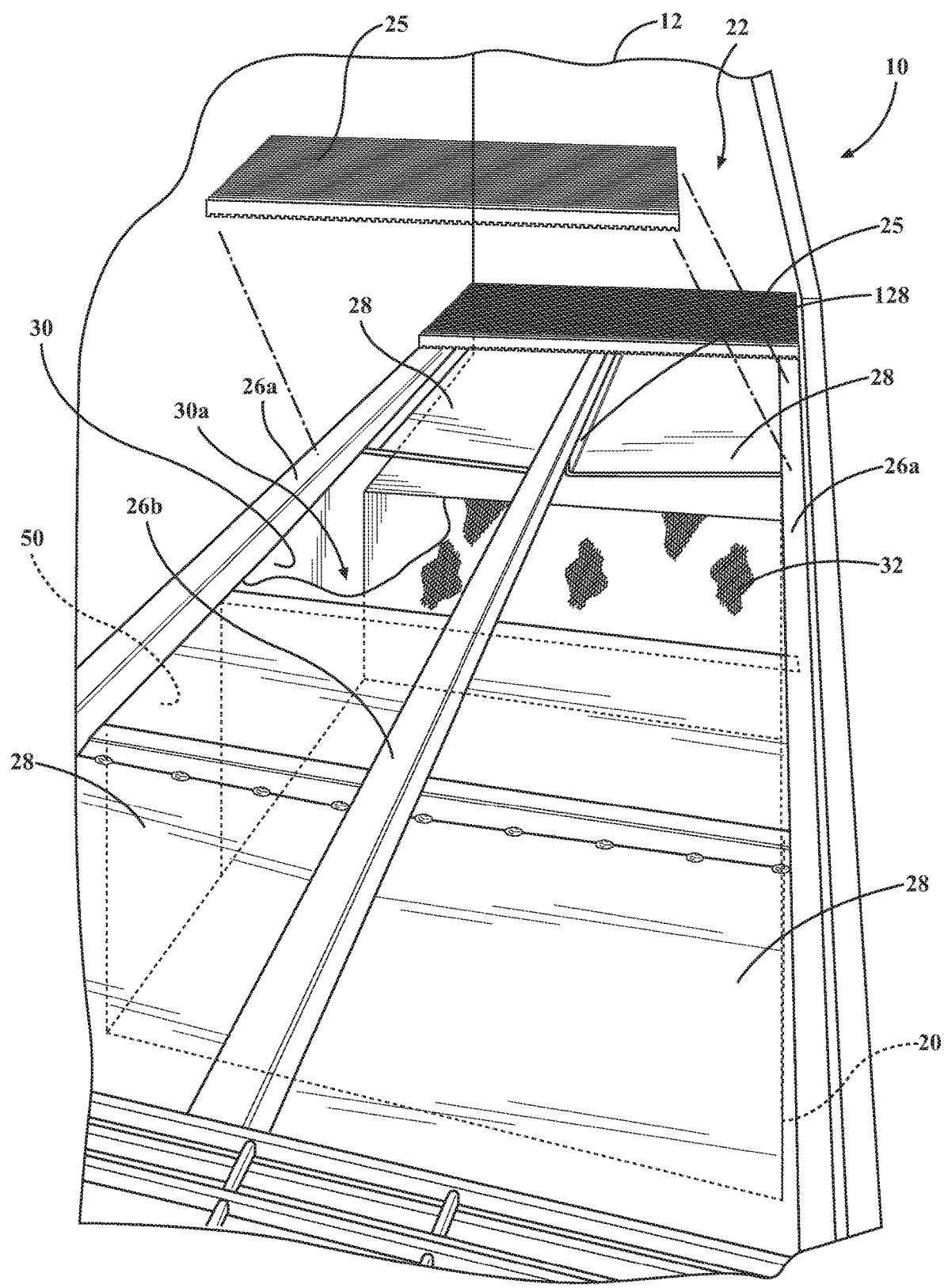
FIG. 2 is a perspective view of an interior rack portion of the washing machine of FIG. 1, with a portion of a top screen over the water tank cut away.
Figure 3:
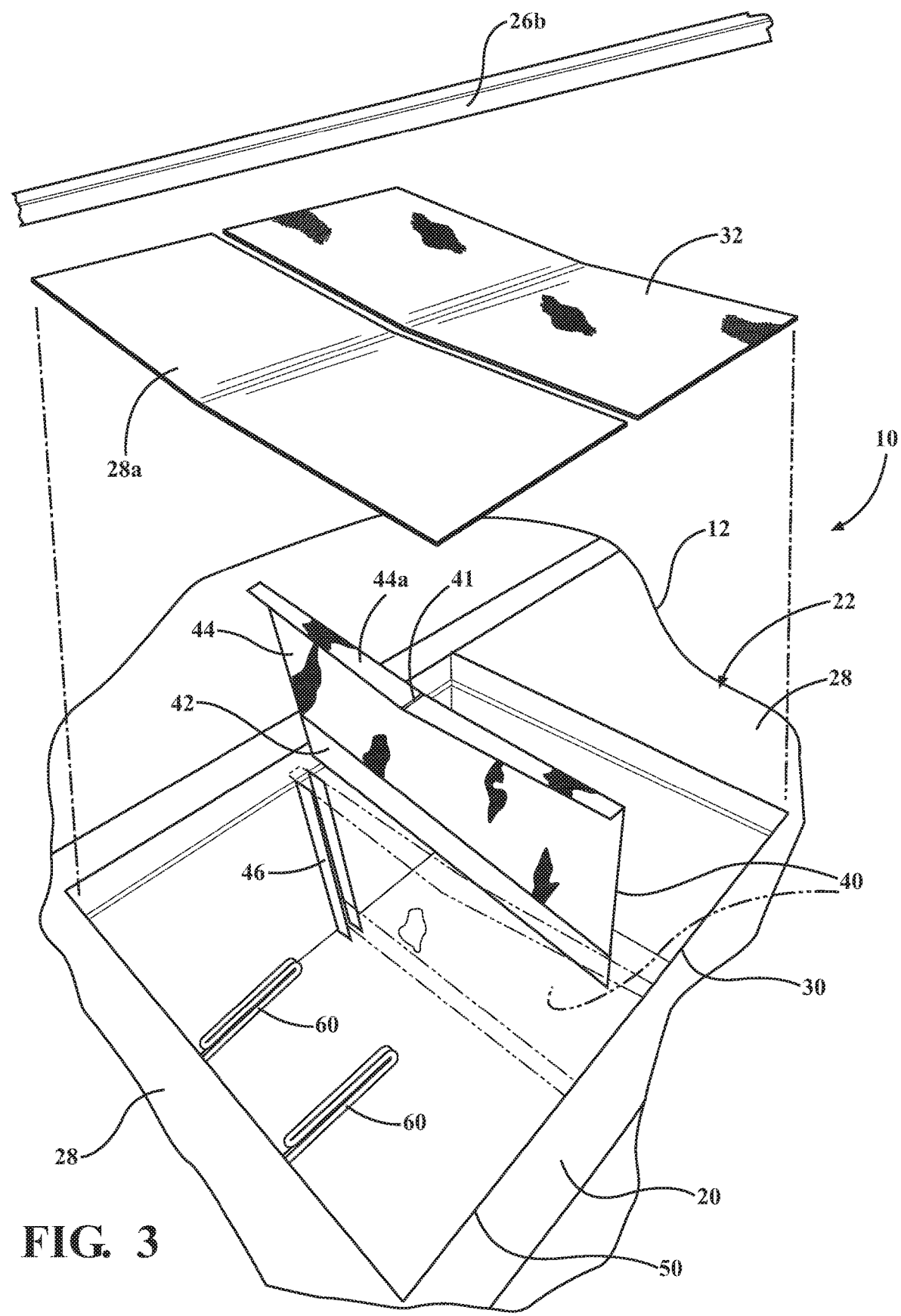
FIG. 3 is a perspective view from an opposite angle of the interior rack portion of the washing machine, with a top panel shown removed from the re-circulating half of the water tank.
Figure 4:
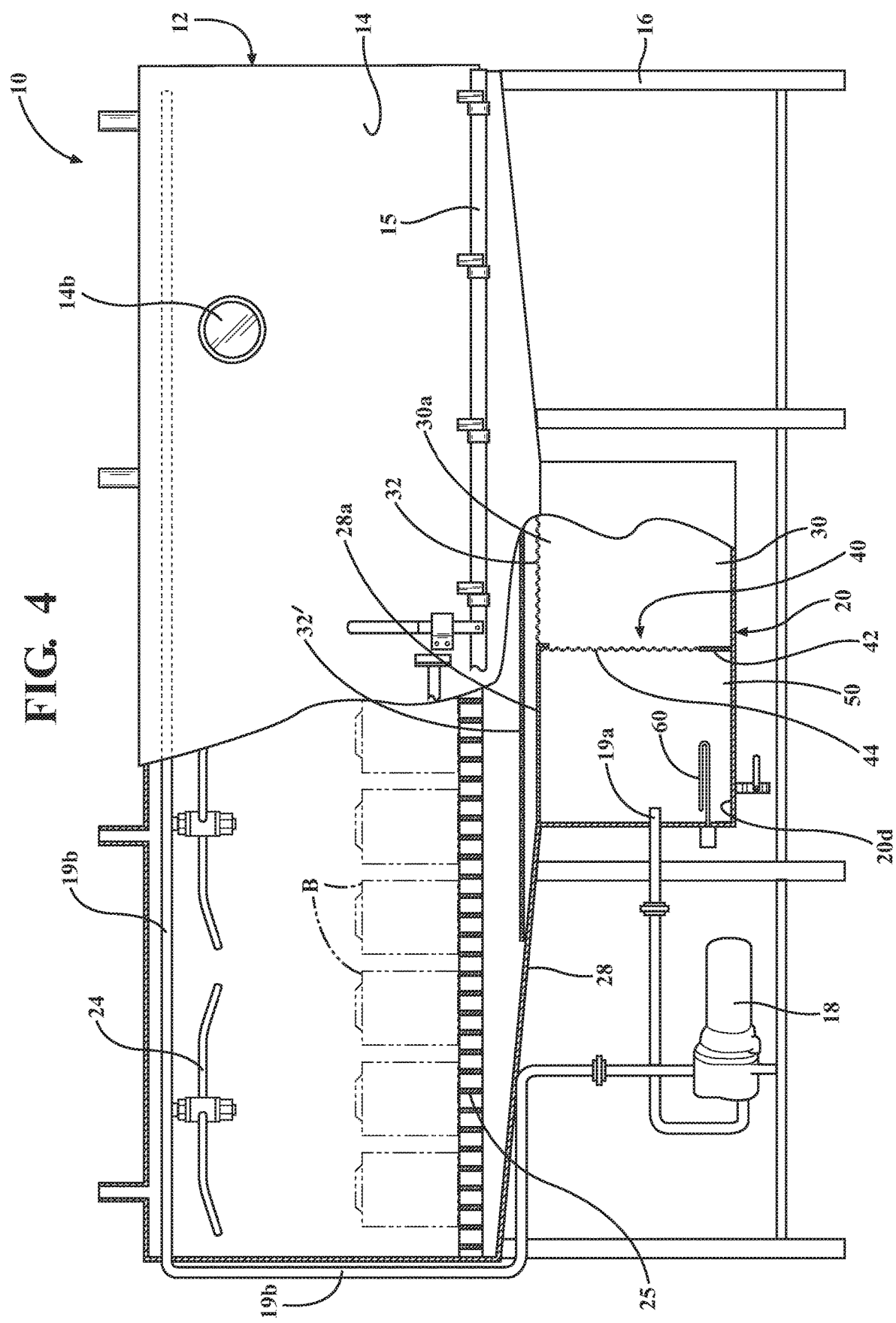
FIG. 4 is a front section view of the washing machine of FIG. 1.

Referring next to FIGS. 2 through 4, drain racks 25 are supported at the front and back edges of the wash compartment 22 on flanges, rails, frame members, or other supports 26a running end-to-end along the front and back edges of the lower part of the wash compartment 22. In the illustrated example the racks 25 are also supported centrally by a removable support rail or beam 26b running along the middle of the wash compartment from end to end. While multiple racks 25 are shown and described, the racks could be combined into a single removable rack depending on the size and length of the wash compartment.

The bottom of wash compartment 22 is lined with one or more stainless steel diverter panels 28 underneath battery racks 25 and removable rack support 26b, the diverter panels angled downwardly toward an open upper end 30a of water tank 20 at the lowermost portion of the wash compartment associated with a separator portion 30 of the tank. A cover panel 28a (or a portion or extension of one of the diverter panels 28) is removably mounted in flat, horizontal fashion to normally close upper end 50a of water tank 20 associated with a recirculating supply portion 50 of the tank. Cover panel 28a functions as a continuation of the angled diverter panels 28 to direct water to the open upper end 30a of the water tank 20. Panels 28 may be secured underneath removable rack support beam 26b, as best shown in FIG. 2. The majority of water sprayed by rotors 24 onto batteries B in wash compartment 22 accordingly drains through the openings in racks 25 onto panels 28, where the water is diverted to run toward and into the open upper end 30a of tank 20 at the lowermost part of the wash compartment. In FIG. 2 only some of the racks 25 are shown, for clarity.

The open upper end 30a of tank 20 is provided with a flat horizontal screen 32 in place of a solid panel, so that water runs through the screen prior to entering the separator portion 30 of the tank. Screen 32 screens out debris in the return wash water, for example dirt, rocks, bits of plastic, and battery labels, in part to protect the pump motor. The mesh size of screen 32 can vary depending on the degree of filtering desired, but should be open enough to allow the used wash water to pour through into tank 20 without backing up into the wash compartment or starving the pump motor 18 of water for re-circulation to the spray rotors 24.

As shown in FIG. 4, additional flat screen or screens 32' may be laid above or on top of some or all of diverter panels 28 to provide a pre-screening action on the water flowing to main screen 32 and the upper open end 30a of tank 20. For this purpose the additional screen 32' may be spaced above the surface of panels 28 and above the cover screen, as shown in FIG. 4, although the additional screen is believed to provide an effective pre-screening even when laid directly on the panels or on the cover screen.

Referring now to FIGS. 3 and 4, the separator and recirculating supply portions 30, 50 of water tank 20 are divided by a substantially vertical separator wall 40. A lower end of separator wall 40 comprises a solid baffle 42 running across the tank, for example on the order of 3-6" inches high for the illustrated tank size 20. The upper portion, and preferably the majority of separator wall 40, comprises a screen wall 44. The dual solid/screen structure of separator wall 40 allows solid, heavier-than-water contaminants (e.g., dirt, sand, metal particles, perhaps certain immiscible fluids) and others still entrained in the water flowing into the open upper end 30a of tank 20 through screen 32 to settle out on the bottom of separator portion 30, trapped by lower solid baffle 42 similar to the action in a septic tank. Contaminants that might have slipped through screen 32 are trapped in separator compartment 30 by screen wall 44, which preferably has the same mesh size as screen 32 over the upper end of the tank.

The solid and screen portions 42, 44 of separator wall 40 may be formed integrally or separately, and in the illustrated example are removably secured in tank 20 by sliding them vertically edge-wise into vertical channels 46 formed along the front and back sides of the tank. The upper end 44a of screen wall portion 44 may be bent into a horizontal flange that can support or be secured edge-wise in a slot or channel in the inner edge of removable cover panel 28a bordering separator wall 40, and that can also form a support for the inner edge of screen 32.

Recirculating supply portion 50 of water tank 20 contains one or more heater elements 60 of known type, for example electric immersion heating elements, powered from the same power supply as pump motor 18. Heater elements 60 are preferably raised off the bottom wall 20d of tank 20 a distance greater than the height of solid separator baffle 42, so that if solids overflow from the separator half 30 and settle out on the bottom of the recirculating supply portion 50 they do not come into contact with and contaminate the heater elements. The intake end of supply piping 19a is also located in recirculating supply portion 50 of the tank, preferably above heater elements 60, to deliver water to the pump motor 18.

Referring to FIGS. 2 and 3, the solids, sludge, and other contaminants that have been screened and separated out of the recirculating wash water can be periodically cleaned out of tank 20 through open upper end portions 30a and 50a, by simply removing the associated battery racks 25, the diverter panel 28a covering the separator tank, and any cover screen 32. This provides trained personnel direct access to the interior of tank 20 for thorough cleaning and decontamination. Ease of cleaning is further improved by the preferred removability of some or all of the vertical separator wall 40 in the tank.

As best shown in FIG. 3, the upper flange end 44a of screen wall portion 44 of the separator wall 40 is angled from the front and back sides of the tank toward the middle at 41, providing a shallowly V-shaped angled rest or shelf for a correspondingly angled cover screen 32 and/or to match a corresponding angled inner edge contour of a removable diverter panel 28a. This promotes drainage from the front and back of wash compartment 22 toward the middle of tank 20.

Figure 5:
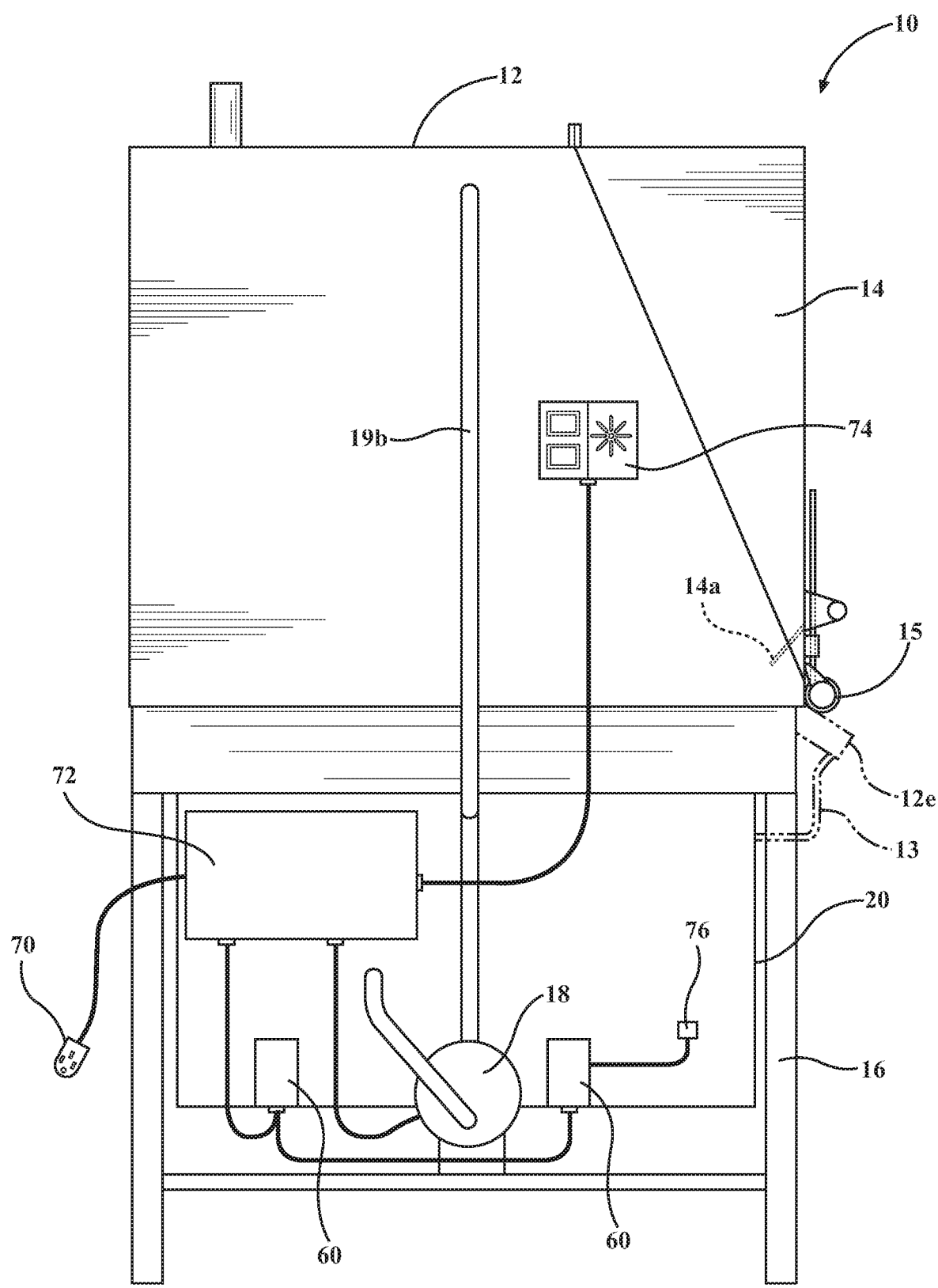
FIG. 5 is a side section view of the washing machine of FIG. 1.

An example control and power supply configuration is shown in FIG. 5, and may include a high voltage power supply plug 70 and power box 72 connected to pump motor 18 and other electrical components; a manual switch control box 74 with both pump, heat, and timer options; and a thermostat element 76 coupled thermally to tank 20 to control the heating elements. These and other control and power supply features are conventional and generally known for recirculating heated water through a closed loop in a washing-type machine, and will be apparent to those skilled in the art.

Also visible in FIG. 1 and in FIG. 5 in hidden and/or phantom lines are an angled drip tray edge 14a formed along the inside lower edge of door 14, and a trough 12e on a front edge of cabinet 12 below rotating latch 15 and the lower edge of door 14. Drip tray edge 14a helps divert the sprayed water from rotors 24 back toward the interior of the wash compartment when door 14 is closed, and when the door is first opened. Trough 12e catches additional water that may drip from the door, or from batteries as they are removed from the wash compartment. Trough 15 has a drain tube 13 running from a central portion of the trough into tank 20 to return the water to the tank. The door 14 may also have windows 14b (FIG. 4) formed in its outer panel, so that the wash process can be observed, and cabinet 12 may be equipped with a rotating latch tube 15 or other latching mechanism to more securely seal the door against the cabinet.

Description of Operation

In operation, the battery washing machine is used by filling tank 20 with wash water, placing one or more batteries B on racks 25 in the wash compartment 22, closing door 14, and turning on the recirculating pump motor 18 to begin the wash cycle.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been used to describe new and useful improvements in science and the useful arts. The scope of the invention supported by the above disclosure should accordingly be construed within the scope of what it teaches and suggests to those skilled in the art, and within the scope of any claims that the above disclosure supports in this application or in any other application claiming priority to this application.

The invention claimed is:

1. A method for washing vehicle and industrial batteries, comprising:

placing batteries on a horizontal drain rack in a lower portion of an interior wash compartment of an enclosed wash cabinet beneath an overhead spray assembly in the wash compartment;

spraying the batteries with wash water from the overhead spray assembly, and delivering used wash water to a screened open upper end of a separator compartment in a recirculating water tank at a lowermost portion of the wash compartment via a downwardly angled diverter panel in the wash compartment beneath the horizontal drain rack;

recirculating the used wash water to the spray assembly from a recirculating supply compartment in the recirculating water tank via a recirculating pump connected to the recirculating supply compartment and to the spray assembly; wherein, debris in the used wash water is settled out of the used wash water in the separator compartment in the recirculating water tank, the separator compartment separated from the recirculating supply compartment by a vertical separator wall, the vertical separator wall comprising a solid lower baffle section and an upper screen section; wherein, the used wash water is prevented from reaching the recirculating supply compartment prior to the separator compartment by a cover panel positioned over an upper end of the recirculating supply compartment, said cover panel extending from the diverter panel to the separator wall to direct water to the screened open upper end of the separator compartment.

2. The method of claim 1, wherein the cover panel over the upper end of the recirculating supply compartment and a cover screen over the screened open upper end of the separator compartment in the recirculating water tank form a flat horizontal plane defining the lowermost point of the wash compartment.

3. The method of claim 1, wherein the debris separated out of the used wash water in the separator compartment is periodically cleaned out of the separator compartment by personnel authorized to handle toxic and/or environmentally hazardous material.

* * * * *